United States Patent [19]

Heggenstaller

[11] 4,358,418

[45] Nov. 9, 1982

[54] METHOD AND APPARATUS FOR MAKING COMPRESSED COMPOSITE BODIES OF PLANT PARTICLES AND BINDER

[76] Inventor: Anton Heggenstaller, Mühlenstr. 9, 8891 Unternernbach, Fed. Rep. of Germany

[21] Appl. No.: 176,004

[22] Filed: Aug. 7, 1980

[30] Foreign Application Priority Data

Aug. 9, 1979 [DE] Fed. Rep. of Germany ....... 2932406

[51] Int. Cl.³ ........................ B29J 5/00; B29F 3/014; B29G 2/00

[52] U.S. Cl. .................................... 264/108; 264/113; 264/120; 264/126; 264/320; 264/323; 425/145; 425/325; 425/376 R; 425/379 R; 425/381; 425/466

[58] Field of Search ........................ 264/108, 113–114, 264/117, 120, 126, 320, 323; 425/381, 466, 465, 378 R, 379, 145, 149, 79 R, 376 R, 325

[56] References Cited

U.S. PATENT DOCUMENTS

| | | | |
|---|---|---|---|
| 2,227,461 | 1/1941 | Morin et al. | 264/245 |
| 3,578,523 | 5/1971 | Ohse | 264/120 |
| 3,989,433 | 11/1976 | Furman | 425/381 |
| 4,124,347 | 11/1978 | Miller | 425/466 |

FOREIGN PATENT DOCUMENTS

| | | |
|---|---|---|
| 1703414 | 5/1972 | Fed. Rep. of Germany . |
| 2253121 | 5/1974 | Fed. Rep. of Germany . |
| 2454280 | 5/1976 | Fed. Rep. of Germany . |
| 2535989 | 2/1977 | Fed. Rep. of Germany . |
| 2539674 | 3/1977 | Fed. Rep. of Germany . |

*Primary Examiner*—Jeffery R. Thurlow
*Attorney, Agent, or Firm*—Karl F. Ross

[57] ABSTRACT

A method of and apparatus for the cold extrusion of a mixture of plant particles and a binder, especially for the production of load-bearing beams and similar shaped bodies in which the plant particles are wood chips or the like, utilizes a plunger, ram or piston for displacement of the mixture into the extrusion passages (in which hardening can occur) under conditions such that the material flows during compaction and is compressed with a densification ratio of 2:1 to 4:1 (preferably 3:1), a plunger stroke of 400 to 800 mm (preferably 600 mm) and a velocity of the plunger between 0.04 and 1.5 meters per second (preferably 0.06 meters per second).

12 Claims, 4 Drawing Figures

HEATED
COOLED
PLUNGER DRIVE

METHOD AND APPARATUS FOR MAKING COMPRESSED COMPOSITE BODIES OF PLANT PARTICLES AND BINDER

FIELD OF THE INVENTION

My present invention relates to a method of and to an apparatus for the production of high-strength lightweight composite bodies, especially extruded composite bodies of a binder and a plant-particle filler. More particularly, the invention relates to a method of and to an apparatus for the extrusion pressing of a mixture of plant particles and binder whereby the mixture, after compression and densification, is hardened.

BACKGROUND OF THE INVENTION

Plant-particle composites are well known in a variety of forms and can make use of comminuted plant material, especially wood chips, and various types of binders to produce rigid and coherent bodies for various purposes depending in large measure upon the density of the body. The binders may be phenol-formaldehyde resins, resorcinol resins or other thermosetting and thermohardening materials and the bodies may have strengths which range from load-bearing capacity to merely self-supporting strength and uses ranging from structural board or beam to insulating slab.

Naturally, within the realm of the prior art as within the scope of the present invention, other plant materials and other binders can be used and the products can be employed for other purposes as well.

While the art is aware of numerous methods of fabricating composite structures of the aforedescribed type, the present invention is concerned specifically with the cold-pressing or extrusion-pressing technique which is used for the production of beams and like relatively elongated bodies whose widths and thicknesses may be small fractions of their lengths.

In the production of such elongated bodies, the mixture of the plant particles, which generally have a "grain" or orientation as is the case with wood chips, and the binder in flowable form is metered into a chamber in which a piston plunger or ram is reciprocable to compress the mass and force it into and through a hardening passage having an internal cross section corresponding to the cross section of the body to be made, in which the mass is hardened, e.g. by the application of heat, high-frequency waves or the like, to form the continuous extruded body. The latter may then be cut into appropriate lengths.

Details of processes of this type can be found in German patent documents (Open Applications-Offenlegungsschriften) No. 22 53 121, 25 35 989 and 25 54 280.

In these systems, and in practice, the cold-extrusion pressing is effective with a relatively short stroke of the piston of about 1 to 15 mm, a relatively high frequency of strokes, for example 100 to 120 strokes per minute, and a very high compaction ratio of about 10:1, the latter representing the ratio of the final density (after compaction) to the original density (prior to compaction).

Similar parameters are used for the extrusion pressing of pressed board from wood chips.

When a product is made by extrusion in this fashion, it has an extremely high density and shows a very high specific gravity, so that it may be desirable to reduce the degree of compaction by, for example, the technique described in German patent document No. 25 35 989 whereby the wall sections of the hardening passage are slightly retractable during the press stroke. This reduces the friction during the compaction stroke. During the retraction of the piston, the extruded strand is somewhat relieved as well so that the individual chips or particles are not as adversely affected as would otherwise be the case by the high pulsating forces which are applied.

The structure of the strand fabricated in this manner is shown to consist predominantly of chips or particles whose grains or longitudinal directions run transversely to the direction of the extrusion, i.e. parallel to the compression front and the force-applying end of the piston or in curved layers which basically are transverse to the direction of compression and are convex in the direction in which the force is applied.

Extruded bodies of this structure can be fractured by forces transverse to the length of the body, i.e. by bending loads, parallel to the layers of the chips or particles.

Efforts have been made to revise the orientation of the chips of the extruded strand so that, for example, they will lie more or less perpendicular to the end faces of the latter before hardening and upon hardening will be locked into such orientations. Such approach is taught in German patent document No. 17 03 414 and utilizes a shaped cylinder in which a piston is reciprocable. Nevertheless, at the elevated compaction ratios, with the short strokes and the high repetition rate of the compaction strokes, problems are still encountered with the extruded body.

The fracture surfaces of the beams made by either of these aforedescribed techniques, resulting from the application of bending stress, have a cup-like or hemispherically concave shape.

OBJECTS OF THE INVENTION

It is the principal object of the present invention to provide an improved method of making elongated extruded composites of plant particles and binder whereby the disadvantages of the prior-art systems are avoided.

Yet another object of the invention is to provide a method of cold-extruding compositions of the aforedescribed type to yield hardened bodies suitable for use as beams or other structural members of high bending strength, at low cost and without sacrifice of other properties of the body.

Still another object of the invention is to produce such beams at low cost so that they will have high strength in all directions and substantially lighter weight than earlier beams of equivalent strength.

Still another object of my invention is to provide an improved apparatus for making such beams or other extruding bodies.

It is also an object of this invention to provide an improved load-supporting beam which is fabricated by the method of this invention.

SUMMARY OF THE INVENTION

These objects and others which will become apparent hereinafter are attained, in accordance with the present invention, by a method which enables reorientation of wood chips or other plant materials from layers parallel to or convex to the pressing surfaces into a substantially random or matted orientation extending over the entire cross section of the extruded body, thereby increasing the strength of the latter.

My invention is based upon my discovery that the strength of the extrusion-pressed body is increasingly greater to the extent that fewer of the individual chips or particles remain in the predominantly parallel orientation to the extrusion-pressing surface as in the conventional processes.

According to the invention, this is achieved at least in part by increasing the flow path of the material during the compaction stroke, i.e. by ensuring that each stroke is carried out so that it involves an extended particle flow path by comparison to prior systems, the compaction thus involving a significant flow movement of the material.

Improved results are obtained when the mixture is compressed with a compression or densification ratio of 2:1 to 4:1, preferably 3:1, and/or when the mixture is compacted with a displacement speed of the ram or piston in the range of 0.04 to 1.5 meters per second and preferably 0.06 meters per second; and/or when the operating parameters are such that the density of the strand is 350 to 850 kg per $m^3$, preferably 400 to 600 kg per $m^3$, the mass being displaced at a rate of 0.02 meters per second to 1.5 meters per second, preferably 0.05 meters per second.

It has been found, quite surprisingly, that under the aforedescribed conditions, the orientations of the chips or other elongated particles in the strand are completely different from those of earlier systems, especially on account of the greatly increased stroke of the piston or ram by comparison with earlier systems and the greatly reduced displacement velocity. The increased stroke apparently results in a flow of the original random particles into orientations in which a significant number lie parallel or inclined to the axis of the strand and the compaction direction.

The reduced ram speed ensures a lesser density of the strand which, in combination with the improved internal structure, yields a body having a high strength-to-weight ratio and indeed a significantly higher strength of the finished body than a prior-art strand of equivalent weight or even greater weight per unit length.

In fact, the art has recognized that the tensile and compressive strength of such a strand tends to diminish with greater strand cross section especially with bodies having beam or rod profiles. By contrast, the method of the present invention can increase the strength about 30% above that of bars or beams of corresponding cross section fabricated in accordance with prior-art processes.

The significant increase in strength allows the finished bodies of the present invention to be used as load-supporting beams which can also have an especially esthetic character when at least opposite sides and preferably three adjoining sides of the beam are covered by natural wood layers bonded thereto with an appropriate glue or adhesive. Naturally, the wood facing layers can be provided on all sides of the beam.

I have found that bodies produced in the manner described are extremely effective for pallet blocks, pedestals or columns because of their high stability, low brittleness, compressive strength, shear strength, hardness and resilience. They are also easily attached to other materials by glueing or nailing and are weather resistant. Because of their comparatively low density, they do not materially increase the loads which must be borne by pallet-handling equipment.

Experience has shown that best results are obtained when the stroke of the piston or ram is 400 to 800 mm, preferably about 600 mm, and the speed of the piston is then between 0.04 to 1.5 meters per second, preferably around 0.06 meters per second.

Advantageously the displacement during the compression stroke is substantially continuous and the ram can thus be driven particularly easily by hydraulic means.

It is however possible to step the compaction stroke in speed so that the beginning of the press stroke is effected at higher speed than at the end of the press stroke, the transition to the lowest speed being effected about four-fifths of the way through the stroke.

According to a further feature of the invention, the pressing face of the piston or ram is set back in its central region relative to its outer periphery and is additionally given a corrugated profile with the corrugations extending inwardly toward the center and each individual corrugation having a cross section converging in the inward direction.

This has the advantage that the layers of mass pressed together are irregular and thus merge by an interfitting of the formations constituting the corrugations imparted to the mass. This has been found to increase the tendency toward matting and to facilitate the flow of the chips or particles so that they assume an orientation parallel to the directional flow and the direction of compaction.

I have found further that the cross-sectional shape and dimensions of the passages of the extrusion apparatus also have significant effects upon the quality of the product obtained. According to the invention the apparatus comprises a cylinder in which the ram, piston or plunger is reciprocable and into which the mass is fed laterally, this cylinder communicating with a forming passage which is slightly spaced from a hardening passage downstream of the outlet end of the forming passage.

The hardening passage, which may be heated while the forming passage is cooled, has an upstream section and a downstream section, the latter forming the outlet for the extruded body.

According to a particularly advantageous feature of my invention, the outlet cross section of the forming passage is greater than its inlet cross section, but smaller than the inlet cross section of the first or upstream section of the hardening passage, the inlet passage of the latter being slightly spaced from the outlet cross section of the forming passage. The cross section of the upstream section of the hardening passage increases from its inlet cross section to the final cross section of the extruded body, this final cross section being maintained substantially constant over the second or downstream section of the hardening passage over its entire length. The progressive widening of the forming passage and of the first section of the hardening passage facilitates the swelling of the particles, under the influence of the accompanying binder, in a direction perpendicular to the grain when these particles are oriented parallel to the flow direction as noted above.

According to yet another feature of the invention, the first section of the hardening passage and the forming passage are provided with rigidly interconnected walls and the second section of the hardening passage can be defined by walls which are slightly yieldable in accordance with prior-art yieldable-wall techniques.

This arrangement ensures that the desired density of the extruded strand can be obtained as with the system of German patent document No. 25 35 989 but also that the desired flow of the chips or particles during the compacting process will be promoted. Unlike the result obtained when the system of the German patent document No. 17 03 414, in which the peripheral chips or pieces in the mass are bent to extend parallel to the direction of the extrusion along the surfaces, the chips and pieces treated pursuant to my present invention are oriented at least at the surface parallel to the direction of extrusion while remaining part of a matted structure.

Bending-to-break tests have shown fracture lines with surprising orientation with beams fabricated according to the present invention, the fracture lines extending in a totally unpredictable manner at acute angles to the axis of the beam by contrast with the fracture lines of prior-art beams which lie perpendicular to the outer surface or along concave or similar transverse zones. The fracture lines demonstrate that the beams have significantly increased strength by comparison to those of the prior art and are capable of absorbing higher stresses. The unusual break pattern also demonstrates that at least a significant proportion of the particles or chips are oriented in the direction of extrusion.

I also have found surprisingly that the matting can be improved by the manner in which the mixture is admitted to the cylinder in which the plunger is reciprocated.

According to the invention, the upper part of the cylinder of the cold-extrusion press is provided with a feeder or loading means for the mixture, e.g. in the form of a hopper whose bottom can be opened and closed by a slider formed with a window which registers with the hopper to admit the mixture to the cylinder. I have found that when this slider is opened at least two times and preferably three times for each stroke of the plunger, piston or ram, the filling of the cylinder is more uniform and air inclusions, cavities and the like are eliminated while venting of the gases from the cylinder is facilitated. The matting action improves as well. In fact, the more times the slider is opened and closed per stroke of the plunger, the more intensive is the matting action.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figures 1, 2, 3, 4:
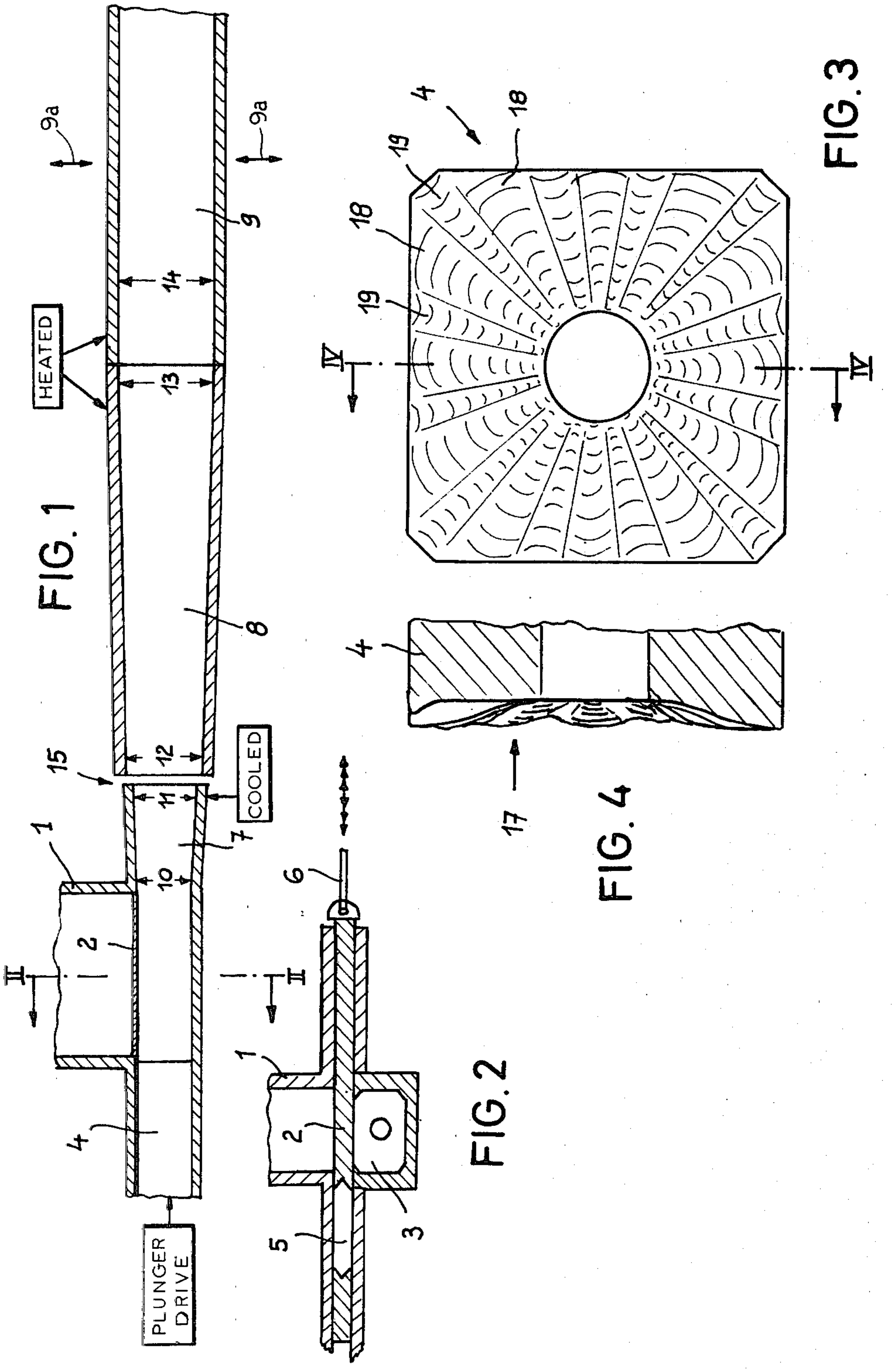
FIG. 1 is a schematic longitudinal section of an extrusion press utilizing the principles of the present invention.
FIG. 2 is a section taken along the line II—II of FIG. 1, drawn to a slightly larger scale with respect to the thickness of a slider shown there.
FIG. 3 is an end view of the piston of the extrusion press of the invention.
FIG. 4 is a cross section taken along the line IV—IV of FIG. 3.

The extrusion press shown in FIG. 1 is intended to extrude a beam of elongated plant particles and binder, especially wood chips and fibers with a thermosetting binder, the mixtures being fed into a first passage 3 from a hopper 1 the bottom of which is provided with a slider 2 having a window 5. Slider 2 is reciprocated by a mechanism represented at 6 but not shown in detail.

Within the passage 3, a plunger, ram or piston 4 is horizontally reciprocable to compact the mixture and drive it to the right (FIG. 1). With each stroke of plunger 4, the slider 2 is reciprocated at least two and preferably more times to fill the chamber 3 in several stages.

The number of openings and closings of the slider 2, moreover, increases the matting of the particles in the extruded strand. In the closed position of the slider 2, the window 5 is laterally offset from the hopper to close the chamber 3 during the pressing stroke.

The piston 4 has an increased stroke by comparison to earlier extrusion presses for similar purposes, preferably around 600 mm. The plunger 4 drives the mass in chamber 3 into a progressively widening forming passage 7 which is cooled as indicated.

The inlet cross section 10 of this passage 7 is smaller than its outlet cross section 11. Preferably, the forming passage has a length between 200 and 800 mm (being thus of the same order of magnitude as the aforementioned piston stroke) with the outlet cross section 11 in at least one of the width or height dimensions being 4 to 5 mm greater than the inlet cross section 10. By way of a small gap 15, the discharge end of the forming passage 7 opens into an inlet end of a progressively widening first section 8 of a hardening passage 8, 9. The gap 15 may have a width of 3 to 5 mm. The hardening passage is heated and thus the gap 15 provides a thermo insulation of the hardening passage from the forming passage. The heating can be effected by any conventional means, e.g. resistive heaters, infrared heaters or even high-frequency heating means. The inlet cross section 12 of the section 8 is greater than the outlet cross section 11 of passage 7, preferably by about 0.4 mm in one dimension or each dimension.

The first section 8 can have a length of about 1,500 mm and terminates in an outlet cross section 13 which is of greater caliber than the inlet cross section 12 by about 0.4 to 5 mm at least in one of the dimensions mentioned. The outlet cross section 13 can correspond to the final cross section 14 of the second section 9 of the hardening passage.

Thus the final cross section of the extruded body is attained initially at this outlet cross section 13.

While the forming passage 7 and the first section 8 of the hardening passage have fixed walls, the wall defining the passage section 9 can be slightly yieldable as represented by the arrows 9*a*, e.g. as described in German patent document No. 25 35 989.

The progressive increase in the cross sections of passages 7 and 8 along the extrusion press permits swelling of the extruded strand without endangering the extrusion operation because of the swelling.

As shown in FIGS. 3 and 4, the end face 1 of the extrusion piston 4 is corrugated and formed with a central bore 16. The piston can be mounted on a stationary rod traversing the bore and extending through the chamber 3. The resulting beam can thus be hollow since it will assume a shape corresponding to that of the piston. The end face 17 has raised and recessed regions 18 and 19 which extend radially and inward from the periphery of the piston, the central portion of this face being set back relative to the edge (see FIG. 4). The raised portions 18 have their greatest widths at the periphery and decrease in widths inwardly, the same being the case for the troughs or recessed regions 19.

Each mass of the mixture compacted by the piston thus has a trailing end of corrugated shape which a leading end of interfits with the next mass to be compacted thereagainst. The configuration imparts a flow to the mass and the chips transverse to the component movement in the direction of compaction, thereby promoting the matting action.

Other profiles of the end face can also be used, e.g. a spiral or concentric arrangement of troughs and crests.

I claim:

1. A method of pressing a mixture of elongated particles and binder which comprises the steps of:

feeding said mixture laterally into an elongated chamber through a gate;

reciprocating a plunger in said chamber to drive the mixture into a forming passage having generally the configuration of a beam-shaped body to be extruded while permitting flow of said particles in the mixture compressed by said plunger, said gate being opened a plurality of times for each stroke of said plunger and the velocity of the plunger and the length of each stroke being such that a substantial proportion of said particles throughout the cross section of said passage are oriented in the direction of displacement of the mixture into said forming passage; and thereafter hardening the compacted mixture, said mixture being compacted by said plunger with a densification ratio between substantially 2:1 and 4:1, said plunger displacing said mixture at a velocity of substantially 0.04 to 1.5 meters per second, said mixture being compacted to a density upon hardening of 350 to 850 kg per $m^3$, said plunger displacing said mixture with a stroke of 400 to 800 mm.

2. The method defined in claim 1 wherein said stroke is about 600 mm, said ratio is substantially 3:1, said velocity is substantially 0.05 meter per second and said density is substantially 400 to 600 kg per $m^3$, said plunger being displaced at a speed of about 0.06 meter per second.

3. The method defined in claim 2 wherein said plunger is driven with a stepped speed decreasing in a latter part of its stroke.

4. An apparatus for the extrusion pressing of a mixture of elongated swellable plant particles and a binder, comprising:

an elongated filling chamber terminating in a progressively widening forming passage provided with cooling means;

a plunger reciprocable in said chamber adapted to displace said mixture toward said forming passage and compact said mixture;

loading means for feeding said mixture to said chamber; and a heated hardening passage with an inlet end slightly spaced from a discharge end of said forming passage for shaping the compacted mixture into a finished body, said inlet end having a cross section larger than that of said discharge end but smaller than that of an outlet end of said hardening passage remote from said forming passage.

5. An apparatus as defined in claim 9 wherein said plunger has a pressing face with radially inwardly extending corrugations narrowing toward the center thereof.

6. An apparatus as defined in claim 5 wherein the center of said pressing face is set back from the periphery thereof.

7. An apparatus for the extrusion pressing of a mixture of elongated swellable plant particles and a binder, comprising:

an elongated filling chamber terminating in a progressively widening forming passage provided with cooling means;

a plunger reciprocable in said chamber adapted to displace said mixture toward said forming passage and compact said mixture;

loading means for feeding said mixture to said chamber; and a heated hardening passage communicating with said forming passage for shaping the compacted mixture into a finished body, said hardening passage having a progressively widening first section with an inlet end slightly spaced from a discharge end of said forming passage, said inlet end having a cross section greater than that of said discharge end, said hardening passage further having a second section connected to said first section and provided with a substantially constant final cross section greater than that of said inlet end.

8. The apparatus defined in claim 7 wherein said loading means comprises a hopper and a reciprocable slider having a window and disposed below said hopper and means for displacing said slider a plurality of times for each stroke of said plunger.

9. An apparatus as defined in claim 7 wherein said second section is bounded by slightly yieldable walls.

10. A method of pressing a mixture of elongated swellable plant particles and a binder, comprising the steps of:

feeding said mixture into a chamber which terminates in a progressively widening forming passage having generally the profile of an elongated body to be produced;

reciprocating a piston in said chamber, with a stroke whose length is of the order of magnitude of the length of said forming passage, to advance said mixture through said forming passage;

cooling said mixture during its advance through said forming passage;

transferring the advancing mixture from said forming passage into a longer and still wider hardening passage; and heating said mixture during its advance through said hardening passage.

11. The method defined in claim 10 wherein the direction of advance is substantially horizontal, said mixture being introduced into said chamber from above in a plurality of stages preparatorily to its entrainment by a stroke of said piston.

12. The improvement defined in claim 10 or 11 wherein said mass is compacted by said piston with a densification ratio between substantially 2:1 and 4:1, said piston displacing said mixture during compaction at substantially 0.04 to 1.5 m/sec. with a stroke of 400 to 800 mm, said mixture being hardened after compaction to a density of 350 to 850 kg/$m^3$.

* * * * *